(12) United States Patent
Halash

(10) Patent No.: US 9,056,246 B2
(45) Date of Patent: Jun. 16, 2015

(54) DYNAMIC REVERSE ENGINEERING

(75) Inventor: Mark Halash, Austin, TX (US)

(73) Assignee: Daybreak Game Company LLC, San Diego, CA (US)

(*) Notice: Subject to any disclaimer, the term of this patent is extended or adjusted under 35 U.S.C. 154(b) by 425 days.

(21) Appl. No.: 12/623,263

(22) Filed: Nov. 20, 2009

(65) Prior Publication Data

US 2010/0210333 A1 Aug. 19, 2010

Related U.S. Application Data

(60) Provisional application No. 61/152,592, filed on Feb. 13, 2009.

(51) Int. Cl.
*A63F 9/00* (2006.01)
*A63F 13/40* (2014.01)

(52) U.S. Cl.
CPC ......... *A63F 13/10* (2013.01); *A63F 2300/6018* (2013.01); *A63F 2300/609* (2013.01); *A63F 2300/807* (2013.01)

(58) Field of Classification Search
None
See application file for complete search history.

(56) References Cited

U.S. PATENT DOCUMENTS

| | | | |
|---|---|---|---|
| 6,322,077 B1* | 11/2001 | Braunlich et al. | 273/292 |
| 7,677,979 B2* | 3/2010 | Van Luchene | 463/42 |
| 2007/0129126 A1* | 6/2007 | Van Luchene | 463/1 |
| 2007/0129148 A1* | 6/2007 | Van Luchene | 463/42 |
| 2008/0004094 A1* | 1/2008 | Mueller et al. | 463/1 |
| 2008/0004116 A1* | 1/2008 | Van Luchene et al. | 463/42 |
| 2009/0149248 A1* | 6/2009 | Busey et al. | 463/29 |

OTHER PUBLICATIONS

"Reverse Engineering" Oct. 27, 2007. <http://swg.wikia.com/wiki/Reverse_engineering?oldid=60209>.*
Feralmonkey. "Feralmonkey's Reverse Engineering Guide". Sep. 13, 2008. <http://web.archive.org/web/20080913170339/http://www.swgcraft.co.uk/dev/guides.php?id=1>.*
Tucker, "Star Wars Galaxies: Jump to Lightspeed," original date unknown, Game Vortex, Online Review, accessed on Mar. 10, 2009 at http://www.gamevortex.com/gamevortex/soft_rev.php/2109/star-ward-galaxies-jump-to-lightspeed-pc.html, 2 pages.

* cited by examiner

*Primary Examiner* — Seng H Lim
(74) *Attorney, Agent, or Firm* — Ingrassia Fisher & Lorenz, P.C.

(57) ABSTRACT

A computer-implemented method of reverse engineering items in a computer game, including: selecting a first loot item; selecting a reverse engineering tool; placing the first loot item in the reverse engineering tool; and implementing a reverse engineering function on the reverse engineering tool. Keywords include MMO, crafting, reverse engineer, and custom modifier.

26 Claims, 17 Drawing Sheets

DYNAMIC REVERSE ENGINEERING

CROSS-REFERENCE TO RELATED APPLICATIONS

This application claims the benefit of priority of U.S. Provisional Patent Application No. 61/152,592, filed Feb. 13, 2009, entitled "Dynamic Reverse Engineering." The disclosure of the above-referenced provisional application is incorporated herein by reference.

BACKGROUND

A massively multiplayer online (MMO) role-playing game is an online computer game in which a large number of players interact with one another in a virtual world. As in most role-playing games, players assume the role of a fictional character (i.e., a Player Character) and take control over most of that character's actions. MMO games are distinguished from single-player or small multi-player games by the game's persistent world, usually hosted by a game provider, which continues to exist and evolve even when the player is away from the game.

The Player Character typically spends most of its time improving itself through the collection of experience points, which are earned, for example, through killing monsters and completing adventures assigned to the Player Character by server-controlled Non-Player Characters or Creatures (NPCs) scattered throughout the virtual world in strategic locations.

Additionally, the Player Character may improve itself by collecting items to be used for powering-up and enhancing particular skills or attachments. For example, the Player Character may combine multiple commonplace items to create a single more valuable item or attachment.

SUMMARY

Implementations of the present invention provide for building an enhancement item using component pieces obtained by deconstructing a first item in a computer game.

Reverse engineering lets players in an MMO crafting system create custom power-up or enhancement items. A player uses a reverse engineering tool or system to break an item such as a weapon into power bits and/or modifier bits. A power bit indicates a level of power and a modifier bit indicates a type of modifier. What type of power or modifier bit is created depends on the original item or items placed into the reverse engineering tool. The player can then combine a power bit and modifier bit to make a power-up or enhancement. For example, a player can combine a +10 power bit with a "strength" modifier bit to make a power-up that provides +10 to a strength attribute to a character in a game. To use the power-up or enhancement, the player applies the item to another item in the game, such as a weapon or armor. A player can also create better power bits and more complicated power-ups and enhancements through different combinations.

In one implementation, a method of reverse engineering items in a computer game includes: selecting a first loot item; selecting a reverse engineering tool; placing the first loot item in the reverse engineering tool; and implementing a reverse engineering function on the reverse engineering tool.

In another implementation, a method of reverse engineering items in a computer game includes: selecting a first loot item; selecting a second loot item; selecting a reverse engineering tool; placing the first loot item and the second loot item in the reverse engineering tool; and implementing a reverse engineering function on the reverse engineering tool to deconstruct the first and second loot items into one or more bits. In this implementation, the second loot item is different than the first loot item.

In another implementation, a computer-readable storage medium storing a computer program for reverse engineering items is disclosed. The program includes executable instructions that cause a computer to: select a first loot item; select a reverse engineering tool; place the first loot item in the reverse engineering tool; and implement a reverse engineering function on the reverse engineering tool to deconstruct the first loot item into one or more bits.

In yet another implementation, a computer-implemented method of deconstructing loot items for creating particular bonuses in a computer game is disclosed. The method includes: collecting loot items throughout the computer game; loading the loot items into a reverse engineering tool for reverse engineering sessions; reverse engineering a loot item in the reverse engineering tool into one or more basic bits; and creating a bonus from the one more basic bits.

DETAILED DESCRIPTION

The present invention provides for implementations of a computer game which allow Player Characters (hereinafter referred to as "the players") to create objects and enhancements in an online environment. In one implementation, a player of an online video game deconstructs an object through the user interface of the game into one or more component pieces and converts the component pieces (possibly in combination with other pieces) to design and/or create an enhancement item to be applied to a target item or character. For example, a trader character in an MMO, such as Star Wars Galaxies™ offered by Sony Online Entertainment LLC, reverse engineers an item (e.g., a weapon) which destroys the item to create a component piece. The character then combines that component piece with other component pieces (possibly of different types) to build a power-up or skill enhancing item or attachment that can be added to an item or character. In one implementation, a character can reverse engineer or combine multiple commonplace items to create a single more valuable item or attachment.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In one implementation, the players are enabled to: deconstruct an item into component pieces; combine component pieces into new enhancement items; combine items and/or component pieces to create new items; and create blueprints of items.

In one implementation, a user of a video game builds an enhancement item using component pieces obtained by deconstructing a first item. The enhancement item can be applied to another item or a character to provide a bonus (e.g., improved damage or a bonus or "buff" to an attribute, such as strength).

In one implementation, players of an MMO obtain items by various means (e.g., purchase, rewards, crafting) and can use a reverse engineering interface to deconstruct an item into one or more component pieces. The type of component piece(s) created depends on the source item and may also be random. The reverse engineering may consume the source item in part or in whole. A player can then combine component pieces to create items that provide enhancements or "buffs" that can be applied to characters, items, or other objects in the game. In one implementation, the MMO also provides characters with an interface for designing customized enhancement items to provide specific buffs depending on specific component pieces.

Figure 1:
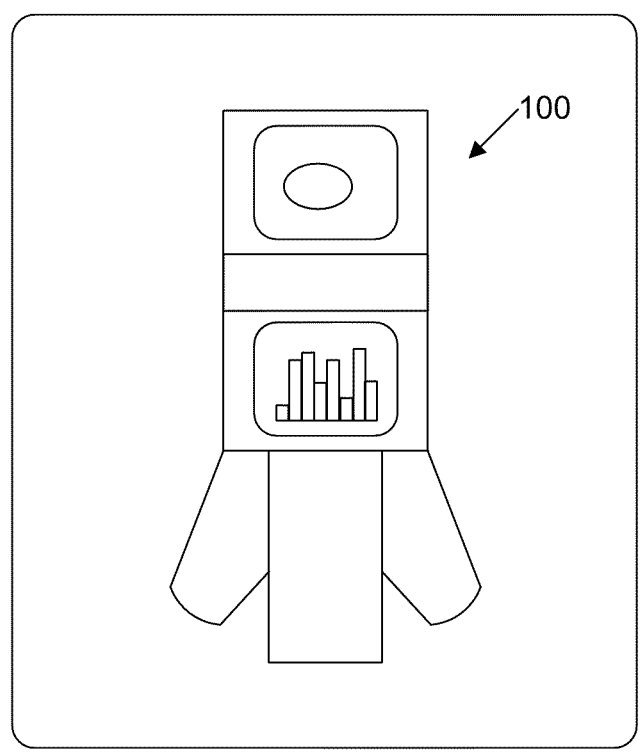
FIG. 1 shows a reverse engineering tool or system used in a computer game in accordance with one implementation of the present invention.

In one specific implementation, the player is allowed to manipulate the controls on the reverse engineering tool or is system 100 (see FIG. 1) to deconstruct loot items into basic components or bits and use the bits to create skill enhancing attachments, power-ups, or better bits. The basic bits include power bits and modifier bits.

In one example, players have the ability to craft the reverse engineering tool. This ability is available at a low skill level, such as Novice Artisan.

In another specific implementation, a user interface 200 (see FIG. 2) is designed to allow the players to input resources they choose to deconstruct in the reverse engineering tool. For simplicity, "reverse engineering" and "deconstructing" may be used interchangeably. For simplicity, "reverse engineering tool" and "reverse engineering system" may also be used interchangeably.

In a further implementation, the players are allowed a chance to combine a plurality of deconstructed resources into a power-up or a skill enhancing attachment. Skill enhancing attachments and power-ups may be added to crafted armor, clothing, and weapons to give them a wide variety of bonuses and modifiers.

In other implementations, the reverse engineering tool is designed by a structure trader; a player uses only one reverse engineering tool at a time; and the player loots and forages for loot items throughout the game. When the loot items are to be loaded into the reverse engineering tool, it can be done in a process similar to a crafting system. The reverse engineering tool provides traders with a new way to customize armor, clothing and weapons, for example. These customized items will be competitive in combat, making them an appealing purchase for customers. In some implementations, players not interested in reverse engineering can sell the obtained loot items to other players such as traders, who may then provide their player associations with the latest and greatest gear.

Figure 2:
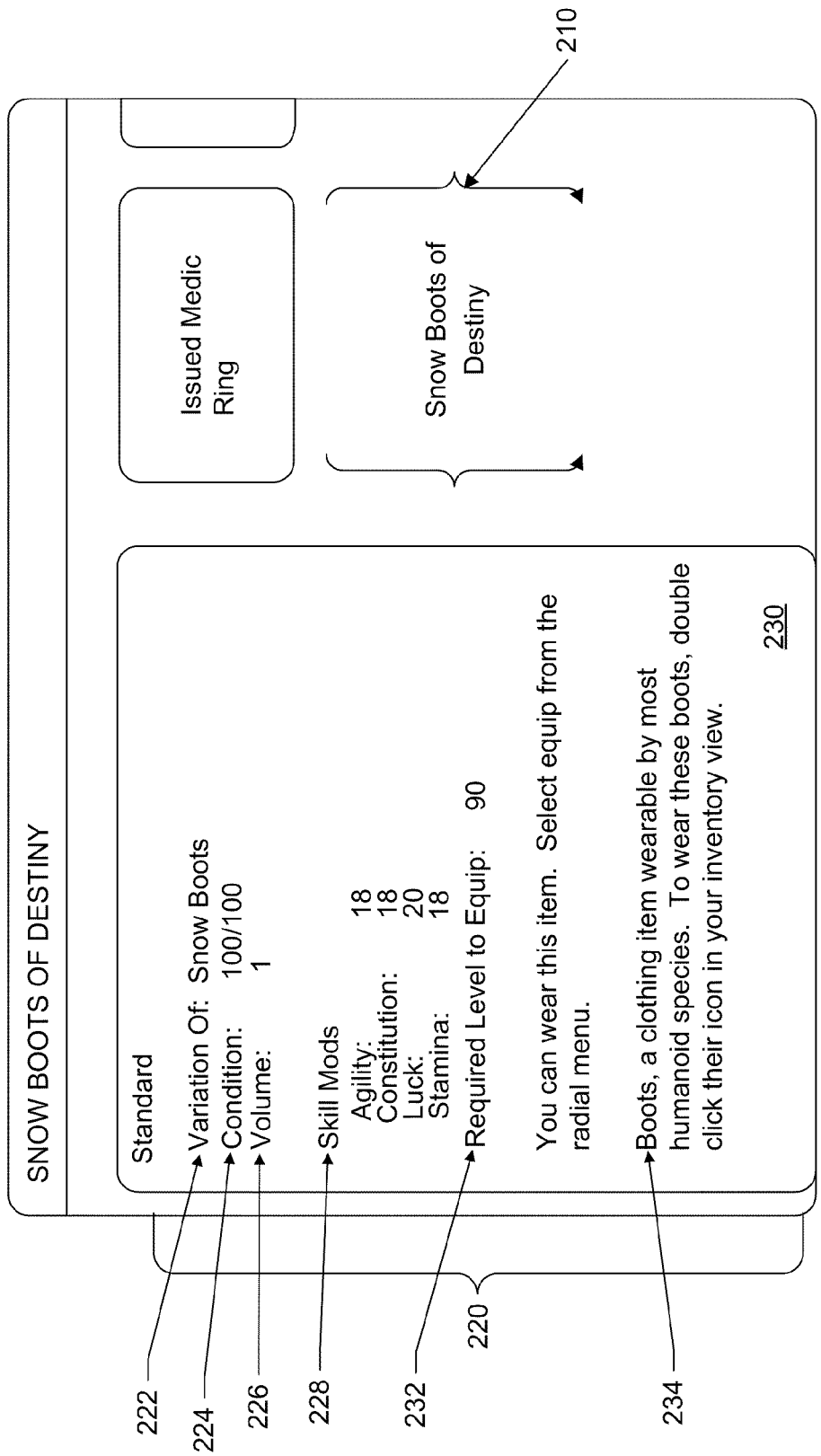
FIG. 2 illustrates one of various user interfaces (UIs) of the reverse engineering tool or system in accordance with implementations of the present invention.

FIG. 2 illustrates a user interface (UI) 200 which allows the players to input resources into the reverse engineering tool in accordance with one implementation of the present invention.

In the illustrated implementation of FIG. 2, a loot item 210 is selected for deconstruction. A description 220 of the loot item 210 is provided in the item window 230. Description 220 of the loot item 210 may include, for example, a title 222, condition 224, volume or quantity 226, skill mods 228, the required level to equip 232, and a synopsis 234.

In the illustrated embodiment of FIG. 2, the first step of creating a power-up is shown. Power-ups are temporary buffs that provide players with a variety of bonuses and/or attribute modifiers.

Creating a power-up begins with selecting a loot item 210 to deconstruct. As will be explained, loot items are reverse engineered by reverse engineering tool 100 into power bits and/or modifier bits.

Loot items with skill modifiers may be reverse engineered to create power bits. Such loot items will often be in the form of armor, clothing, and weapons. In some implementations, once a loot item is deconstructed into a power bit, it will remain a power bit.

Figure 3:
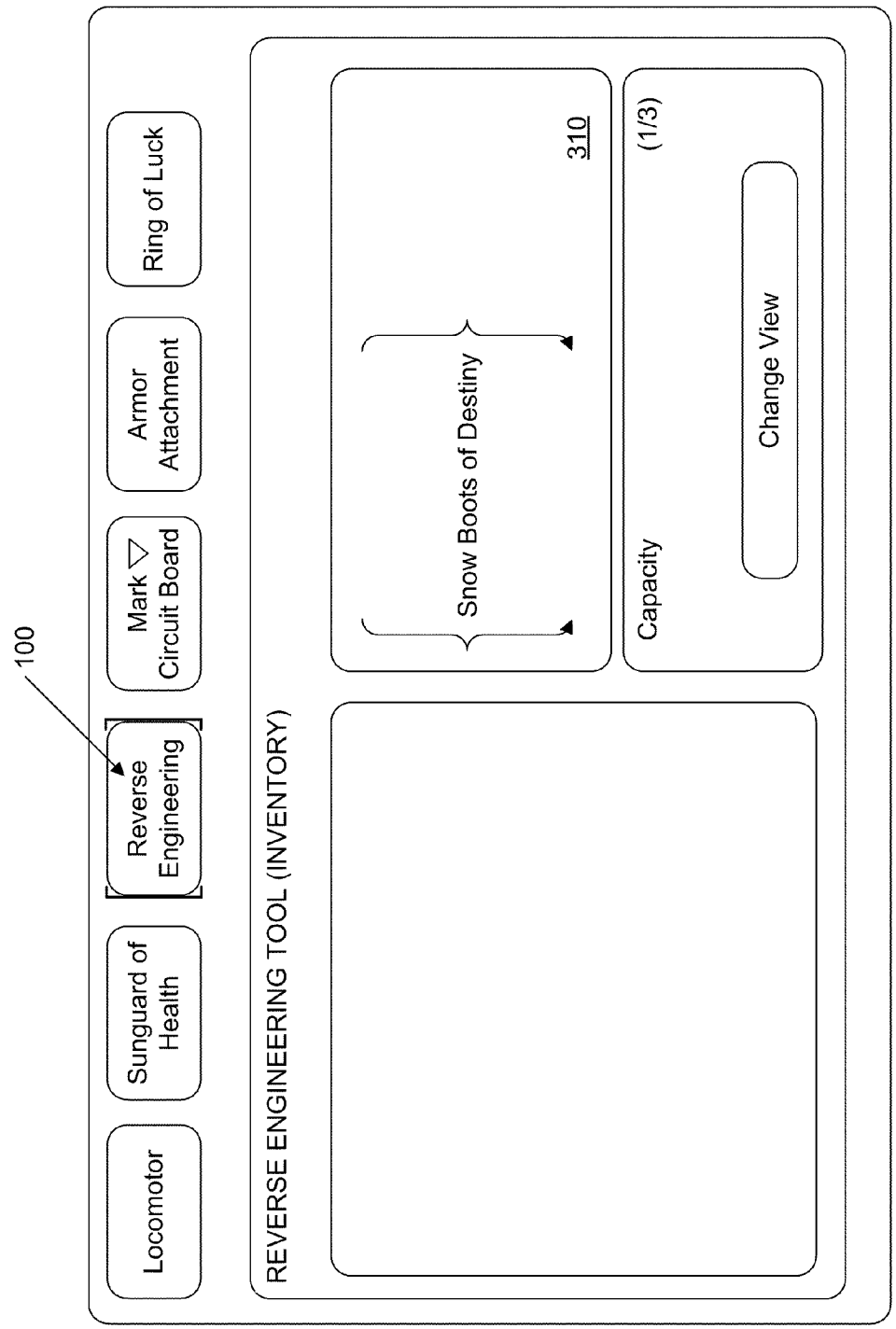
FIG. 3 illustrates one of various user interfaces (UIs) of the reverse engineering tool or system in accordance with implementations of the present invention.

Once the loot item 210 has been selected, the player uses the menu to open the reverse engineering tool 100. In one example, the player uses a radial menu to open the reverse engineering tool 100. The player drags and drops the selected loot item 210 into the inventory window 310 of the reverse engineering tool 100 (See FIG. 3).

In some implementations, an auto-sort inventory feature may affect how the loot item 210 is managed in the inventory window 310. For example, if the auto-sort inventory option is enabled, the loot item 210 will auto-sort in the inventory window 310 and the player will not be able to drag it into another window. In another example, if the auto-sort inventory option is disabled, the player may drag and drop the loot item 210 onto the reverse engineering tool 100, rather than opening the inventory window 310 and placing the item 210 in the inventory window. Thus, by disabling the auto-sort option, the loot item 210 may be moved freely and utilize short-cuts (e.g., dropping the item on the tool).

Figure 4:
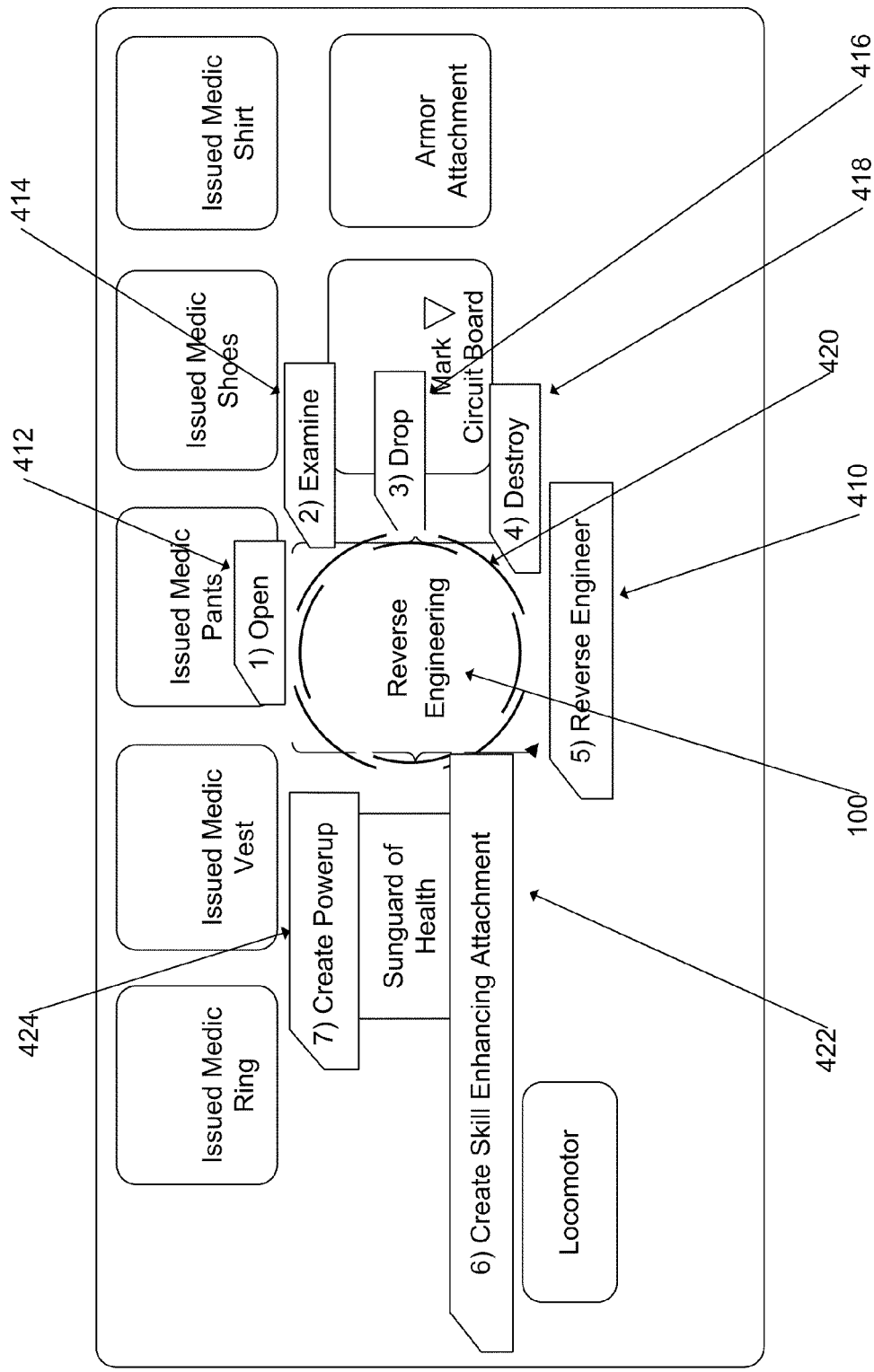
FIG. 4 illustrates one of various user interfaces (UIs) of the reverse engineering tool or system in accordance with implementations of the present invention.

After the loot item 210 appears in the inventory window 310, the player closes the inventory window 310. The player then activates the menu to select the "Reverse Engineer" option 410, shown in FIG. 4. In one example, the player uses a radial menu 420 to activate the "Reverse Engineer" option 410. In addition to the "Reverse Engineer" option 410, radial menu 420 includes reverse engineering options such as "Open" 412, "Examine" 414, "Drop" 416, "Destroy" 418, "Create Skill Enhancing Attachment" 422, and "Create Powerup" 424.

Figure 5:
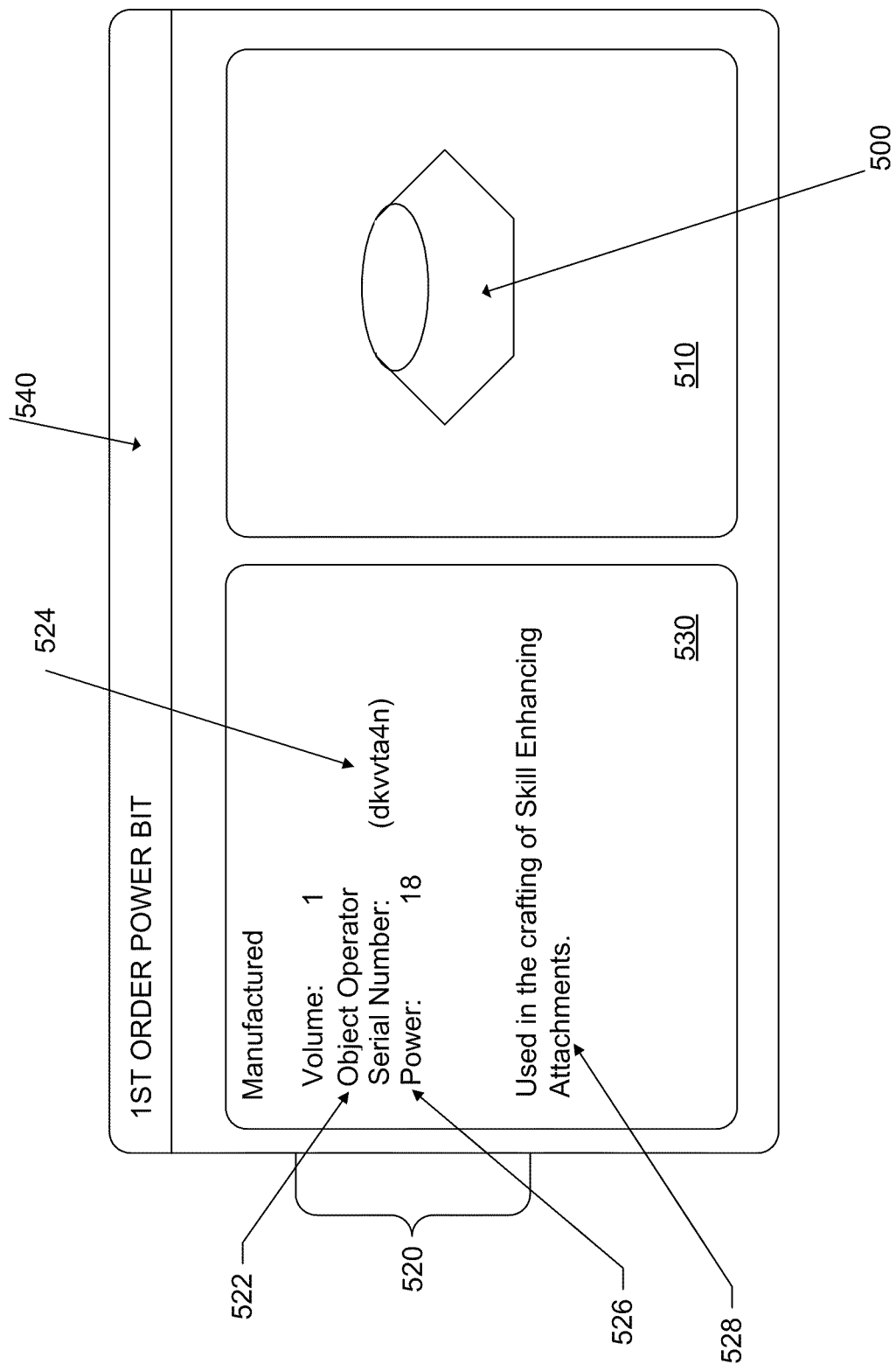
FIG. 5 illustrates one of various user interfaces (UIs) of the reverse engineering tool or system in accordance with implementations of the present invention.

Once the "Reverse Engineer" option 410 is activated, a power bit 500 is placed in the player's inventory. As illustrated in FIG. 5, power bit 500 is placed in inventory window 510. A description 520 of the power bit 500 is provided in item window 530. Description 520 of the power bit 500 may include, for example, a title 522, a serial number 524, a power level 526, and a synopsis 528.

Additionally, in some implementations, a menu tab 540 for power bit 500 indicates the order modifier of the bit. As shown in FIG. 5, power bit 500 is a first order power bit. In general, the order modifier of a bit allows players to create power-ups and skill enhancing attachments with greater effect (e.g., by creating higher order power bits). Thus, the players may create second and third order power bits, corresponding to two and three bonus modifiers, respectively. The creation of first, second and third order bits will be described in more detail with respect to FIGS. 14 and 15.

Figure 6:
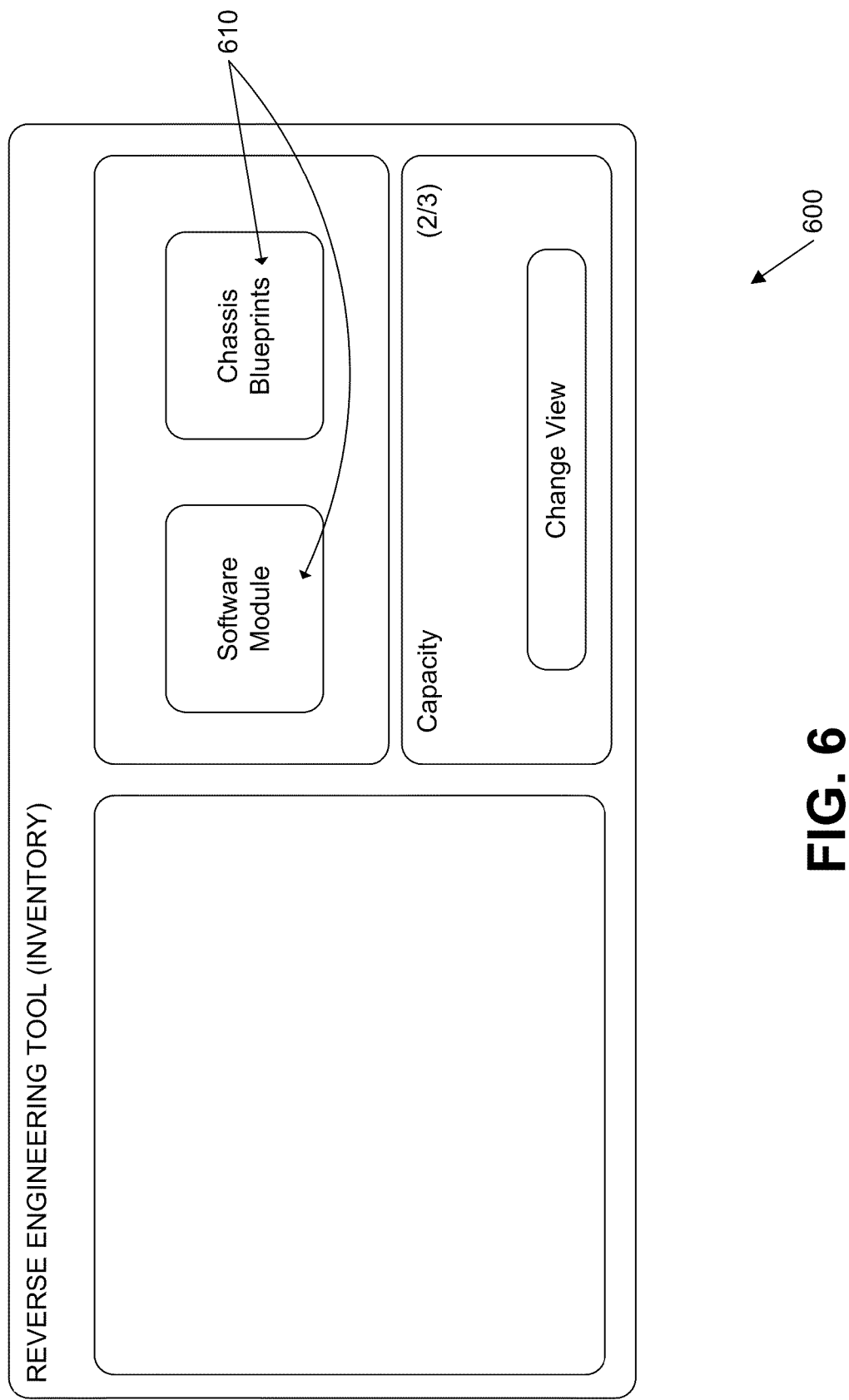
FIG. 6 illustrates one of various user interfaces (UIs) of the reverse engineering tool or system in accordance with implementations of the present invention.
Figure 7:
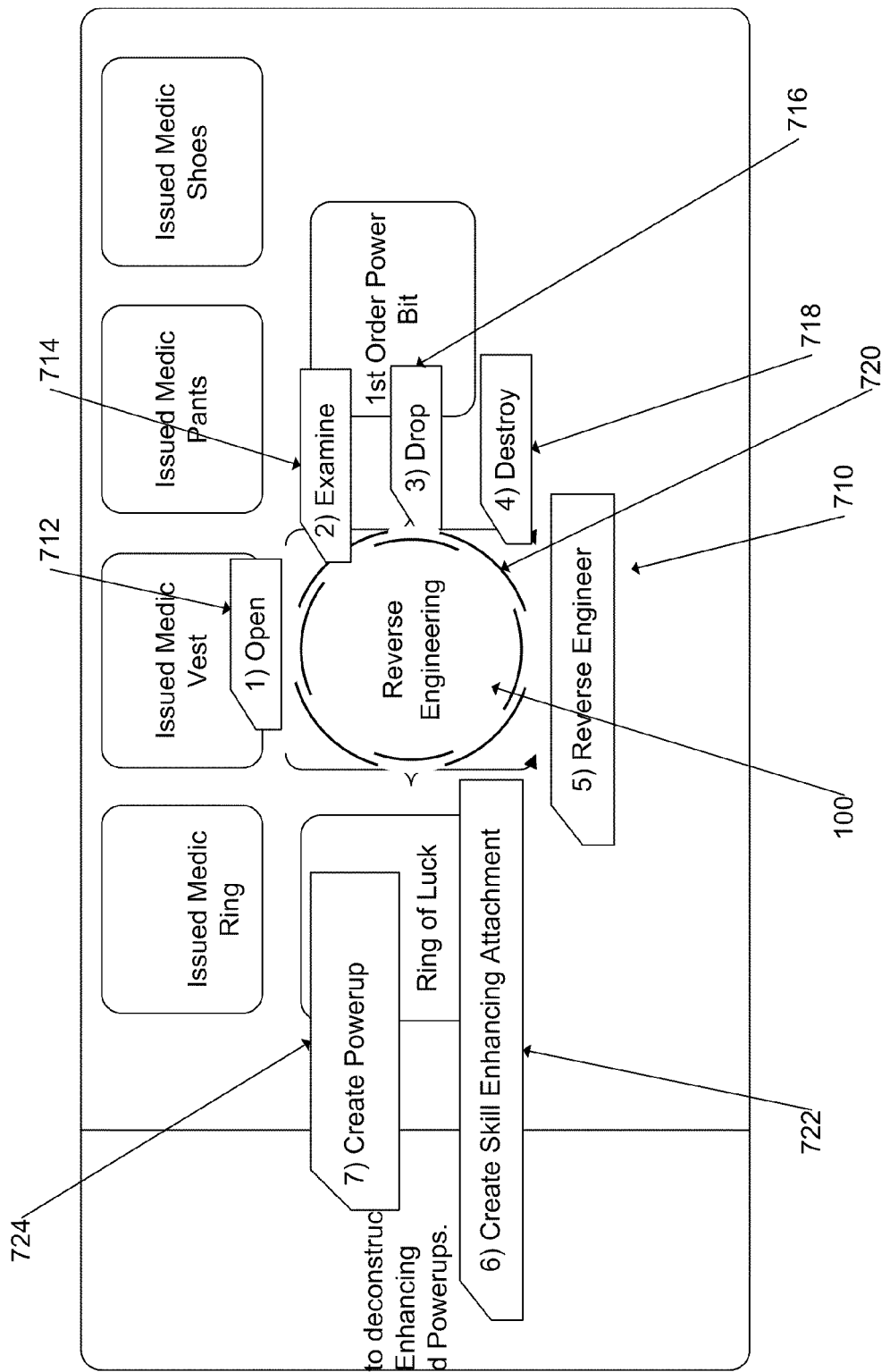
FIG. 7 illustrates one of various user interfaces (UIs) of the reverse engineering tool or system in accordance with implementations of the present invention.

In the illustrated embodiment of FIG. 6, the second step of creating a power-up is shown. Similar to FIG. 2, FIG. 6 illustrates a user interface (UI) 600 which allows the players to input resources into the reverse engineering tool 100 in accordance with one implementation of the present invention.

This second step begins with selecting a loot item 610 to deconstruct into a modifier bit. In some implementations, the loot items used to create modifier bits differ from the loot items used to create power bits. Loot items used to create modifier bits will often be in the form of electronic loot items such as software modules, chassis blueprints, medical devices, circuit boards, etc. As illustrated in FIG. 6, two loot items 610 (software module and chassis blueprint) are shown which may be deconstructed into a modifier bit.

Once the loot item 610 has been selected, the player uses the menu to open the reverse engineering tool 100. In one example, the player uses a radial menu to open the reverse engineering tool 100. The player drags and drops the selected loot item 610 into the inventory window 310 of the reverse engineering tool 100 (See FIG. 3).

After the loot item 610 appears in the inventory window 310, the player closes the inventory window 310. The player then activates the menu to select the "Reverse Engineer" option 710. In one example, the player uses a radial menu 720 to activate the "Reverse Engineer" option 710. In addition to the "Reverse Engineer" option 710, radial menu 720 includes reverse engineering options such as "Open" 712, "Examine" 714, "Drop" 716, "Destroy" 718, "Create Skill Enhancing Attachment" 722, and "Create Powerup" 724.

Figure 8:
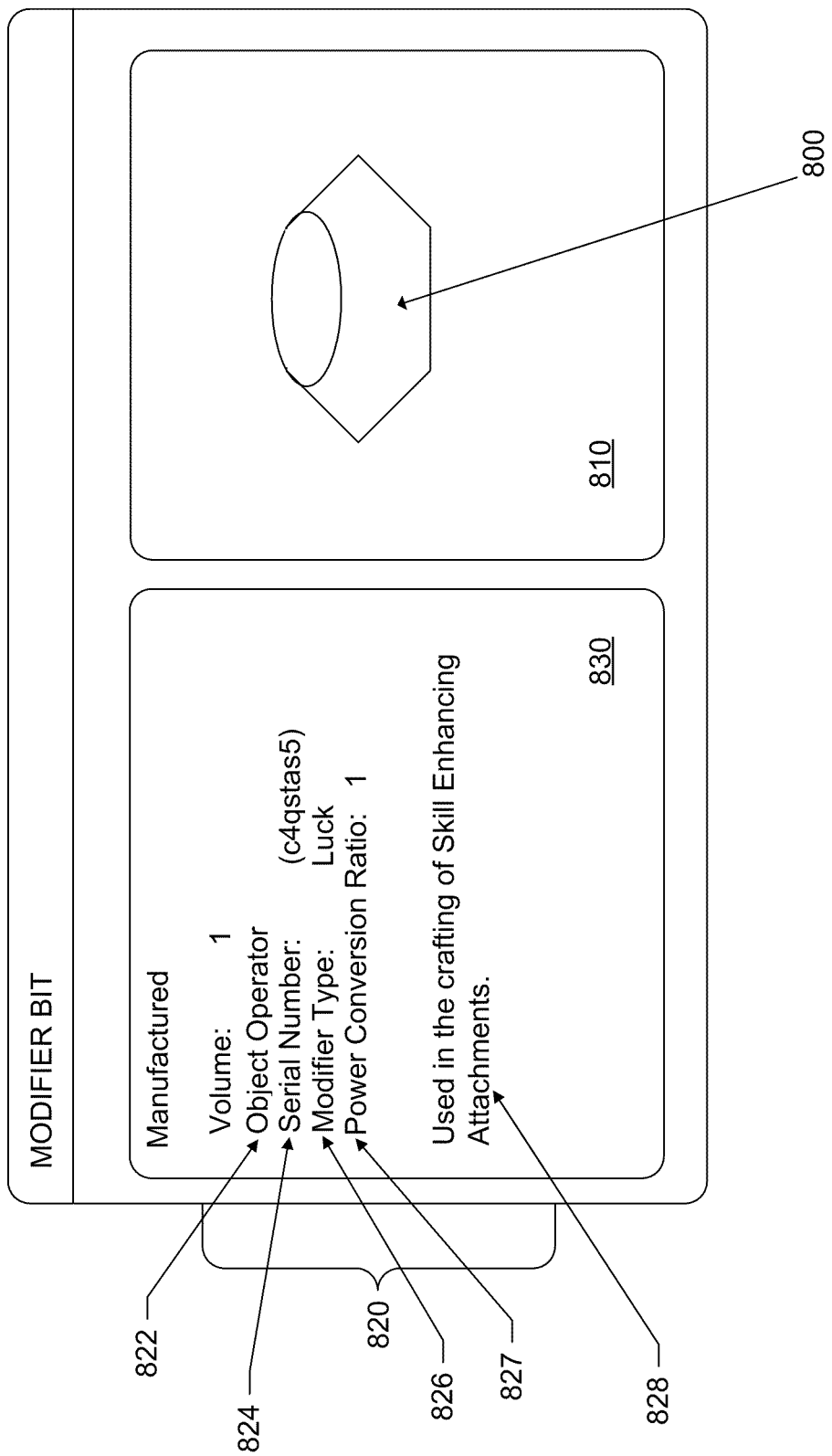
FIG. 8 illustrates one of various user interfaces (UIs) of the reverse engineering tool or system in accordance with implementations of the present invention.

Once the "Reverse Engineer" option 710 is activated, a modifier bit 800 is placed in the player's inventory. As illustrated in FIG. 8, modifier bit 800 is placed in inventory window 810. A description 820 of the modifier bit 800 is provided in item window 830. Description 820 of the modifier bit 800 may include, for example, a title 822, a serial number 824, a modifier type 826, a power conversion ratio 827, and a synopsis 828.

Figure 9:
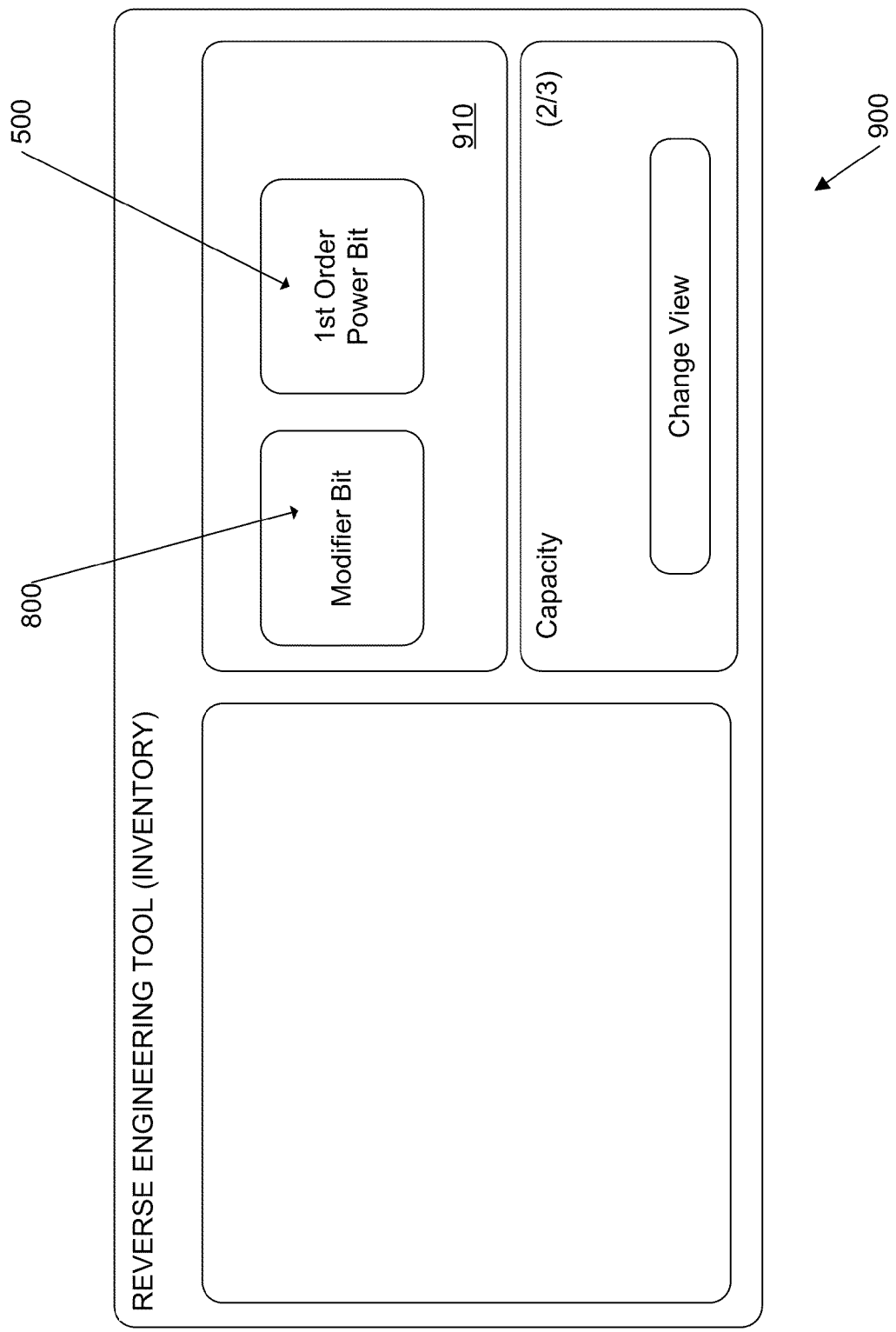
FIG. 9 illustrates one of various user interfaces (UIs) of the reverse engineering tool or system in accordance with implementations of the present invention.

In the illustrated embodiment of FIG. 9, the third step of creating a power-up is shown. Similar to FIGS. 2 and 6, FIG. 9 illustrates a user interface (UI) 900 which allows the players to input resources into the reverse engineering tool 100 in accordance with one implementation of the present invention.

This third step begins with placing the power bit 500 and modifier bit 800 in the reverse engineering tool 100. The player may place the bits 500, 800 in the reverse engineering tool 100 by dragging and dropping the selected bits 500, 800 into the inventory window 910 of the reverse engineering tool 100. Alternatively, the player may place the bits 500, 800 in the reverse engineering tool 100 by dragging and dropping the selected bits directly onto the reverse engineering tool 100 (e.g., when auto-sort option is disabled).

Figure 10:
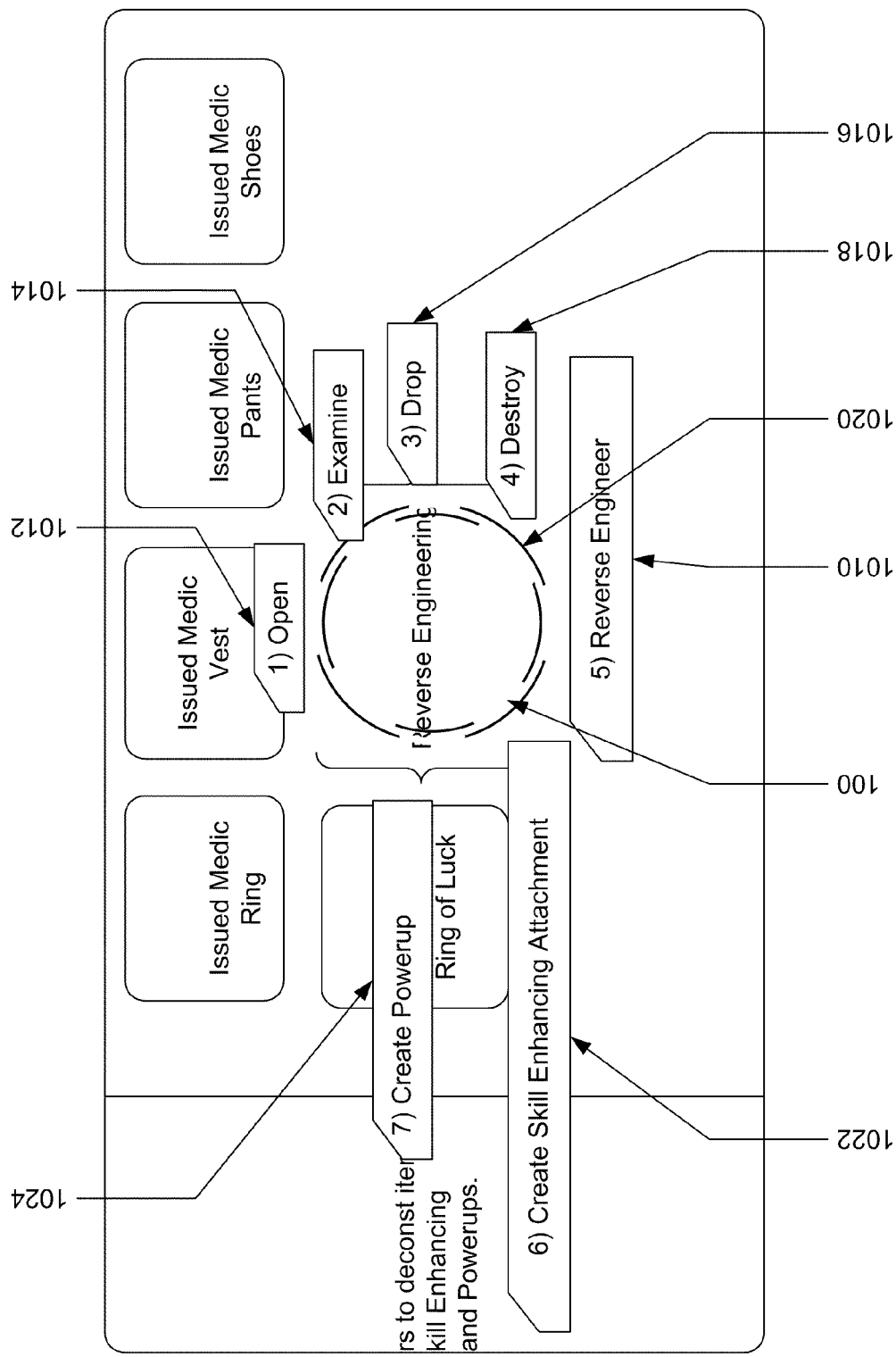
FIG. 10 illustrates one of various user interfaces (UIs) of the reverse engineering tool or system in accordance with implementations of the present invention.

The player then activates the menu to select the "Create Powerup" option 1024, shown in FIG. 10. In one example, the player uses a radial menu 1020 to activate the "Create Powerup" option 1024. In addition to the "Create Powerup" option 1024, radial menu 1020 includes reverse engineering options such as "Reverse Engineer" 1010, "Open" 1012, "Examine" 1014, "Drop" 1016, "Destroy" 1018, and "Create Skill Enhancing Attachment" 1022.

Figure 11:
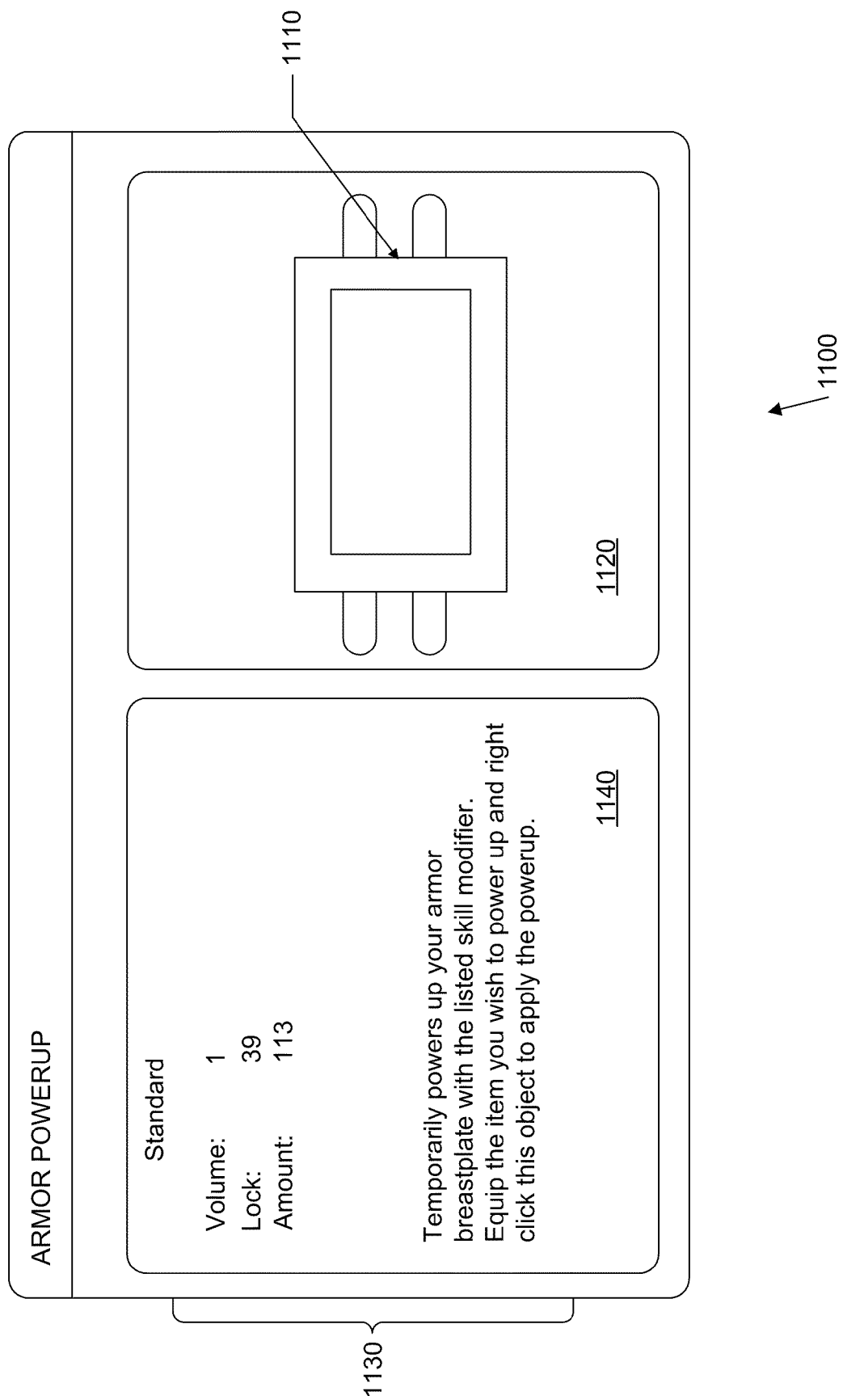
FIG. 11 illustrates one of various user interfaces (UIs) of the reverse engineering tool or system in accordance with implementations of the present invention.

FIG. 11 illustrates a user interface (UI) 1100 which shows an example of a power-up 1110 for armor. The armor power-up 1110 is shown in inventory window 1120. A description 1130 of the power-up 1110 is provided in item window 1140.

In some implementations, power-ups boost clothing, armor, and/or weapons with a temporary bonus to a player's attributes and/or skills. In some implementations, a player may stack power-ups with socketed clothing or armor that has skill enhancing attachments for a combined bonus.

To use a power-up, the player clicks on the power-up 1110. Thereafter, a menu such as a radial menu will appear, allowing the player to select an "Apply Powerup" option. In a specific implementation, power-ups only have one statistic. Examples of statistics include strength, agility, constitution, etc.

In addition to power-ups, players may also create skill enhancing attachments. Skill enhancing attachments are bonuses that a player may add to armor or clothing. In one implementation, the skill enhancing attachment is a permanent bonus.

In some implementations, skill enhancing attachments can be defined as follows: A first order skill enhancing attachment is a skill enhancing attachment with a single statistic. A second order skill enhancing attachment is a skill enhancing attachment with two different statistics. A third order skill enhancing attachment is a skill enhancing attachment with three different statistics. Thus, a second order power bit can be combined with a modifier bit and a first order skill enhancing attachment (which has only one statistic) to create a second order skill enhancing attachment which now has two statistics (the original statistic and the new second statistic which is derived from the combination of the second order power bit and the modifier bit). The process is similar for adding a third order statistic to a skill enhancing attachment.

Figure 12:
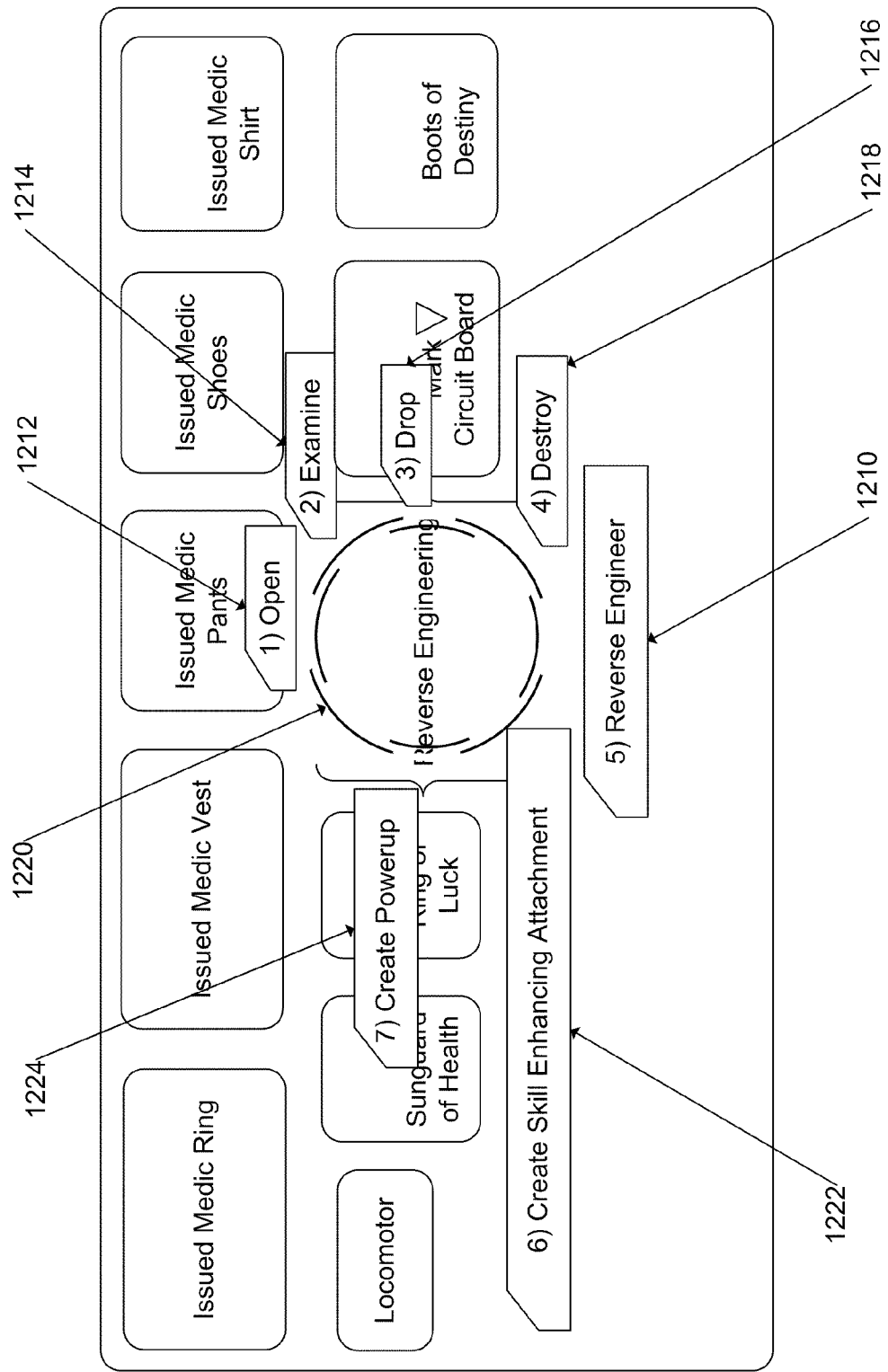
FIG. 12 illustrates one of various user interfaces (UIs) of the reverse engineering tool or system in accordance with implementations of the present invention.

To create a skill enhancing attachment, a player drags and drops the skill enhancing attachment onto a selected piece of armor, clothing or weapon. This process is similar to creating a power-up (as described above with respect to FIGS. 2-10). However, in FIG. 12, instead of selecting "Create Powerup" 1224, as shown in the radial menu 1220, the player selects the "Create Skill Enhancing Attachment" option 1222. Radial menu 1220 includes additional reverse engineering options such as "Reverse Engineer" 1210, "Open" 1212, "Examine" 1214, "Drop" 1216, and "Destroy" 1218.

Figure 13:
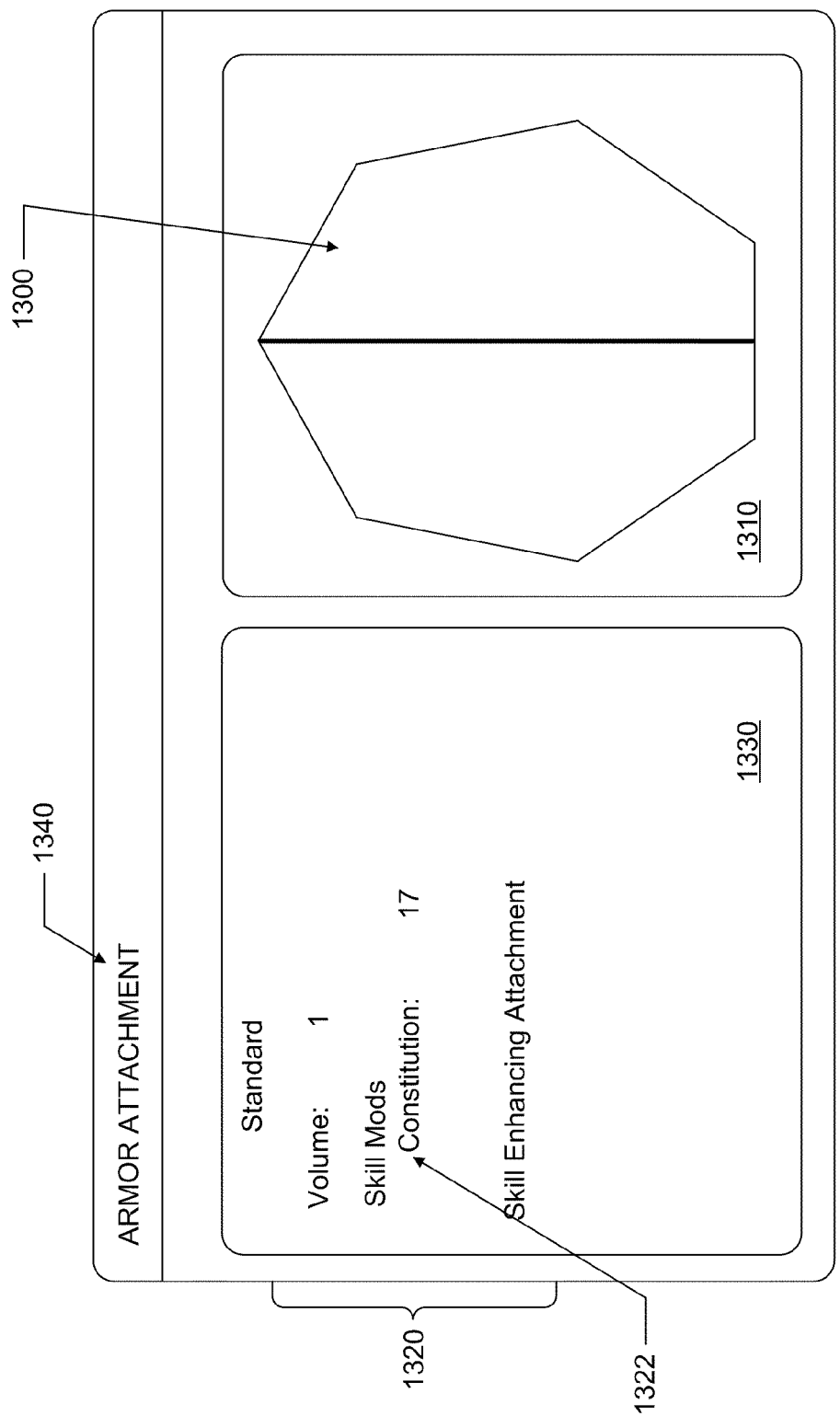
FIG. 13 illustrates one of various user interfaces (UIs) of the reverse engineering tool or system in accordance with implementations of the present invention.

FIG. 13 illustrates an example skill enhancing attachment 1300. Skill enhancing attachment 1300 is shown in inventory window 1310 and is named "Armor Attachment" as shown in menu tab 1340. A description 1320 of the skill enhancing attachment 1300 is provided in item window 1330. Description 1320 of the skill enhancing attachment 1300 may include, for example, special items that can be applied to specific pieces of equipment, such as cloth or armor, that add bonus statistics to those items.

In some implementations, skill enhancing attachments 1300 may be sold, given, or traded to any player to enhance their socketed armor or clothing. In other implementations, traders may place skill enhancing attachments in socketed armor and/or clothing crafted to customize merchandise to be sold.

In addition to creating basic power-ups and skill enhancing attachments, players may create power-ups and skill enhancing attachments with two and three level bonus modifiers (e.g., by creating higher order power bits). In some implementations, players combine power bits, modifier bits, and skill enhancing attachments to create higher order power bits.

As described with respect to FIGS. 2-5, a loot item 210 may be deconstructed into a power bit 500. The strength and power order of the power bit 500 is determined by the source product (e.g., loot item 210) and the skill of the player. For example, an article of stat-modded clothing or armor (e.g., loot item 210) may be dragged and dropped on the reverse engineering tool 100. Stat-modded clothing or armor is an article of clothing or armor that possesses one or more bonus statistics. Some articles of clothing or armor have no statistics and are for appearance only. The player right clicks on the tool 100 and selects the "Reverse Engineer" option 410. Thereafter, a first order power bit 500 drops into inventory 510.

In one implementation, a term "expertise" is defined as a form of secondary advancement wherein players, as they gain levels, earn points that may be spent on "expertise" in order to specialize and customize their character. In some implementations, expertise can be presented graphically in the form of an "expertise tree" comprised of a number of interconnected boxes or nodes. Advancement through an "expertise tree" starts at the top of the tree and is gated such that progress down the tree is linear. That is, in order to reach a particular box further down the tree, all connected boxes leading up to the desired box must first be fully purchased.

Trader Expertise is a collection of individual abilities and modifiers that is available for player traders to purchase using expertise points. Some of these may include specific abilities or modifiers to the reverse engineering system. Among these are the ability to create higher ($2^{nd}$ and $3^{rd}$) order power bits. Higher order power bits allow the player to construct attachments that have two or three different statistics, rather than a single statistic. This makes those items much more valuable and makes pursuing this expertise a compelling option for player traders interested in reverse engineering.

In one example, to create a second order power bit, the player purchases an attachment upgrade from the expertise tree. In some implementations, the attachment upgrade is provided in trader expertise.

In one implementation, the player places a loot item having two statistics associated with it into the reverse engineering tool 100. The player then selects the "Reverse Engineering" option and a second order power bit drops into inventory.

In another implementation, the player places two single statistic loot items into the reverse engineering tool 100. The player then selects the "Reverse Engineering" option and a second order power bit drops into inventory.

Figure 14:
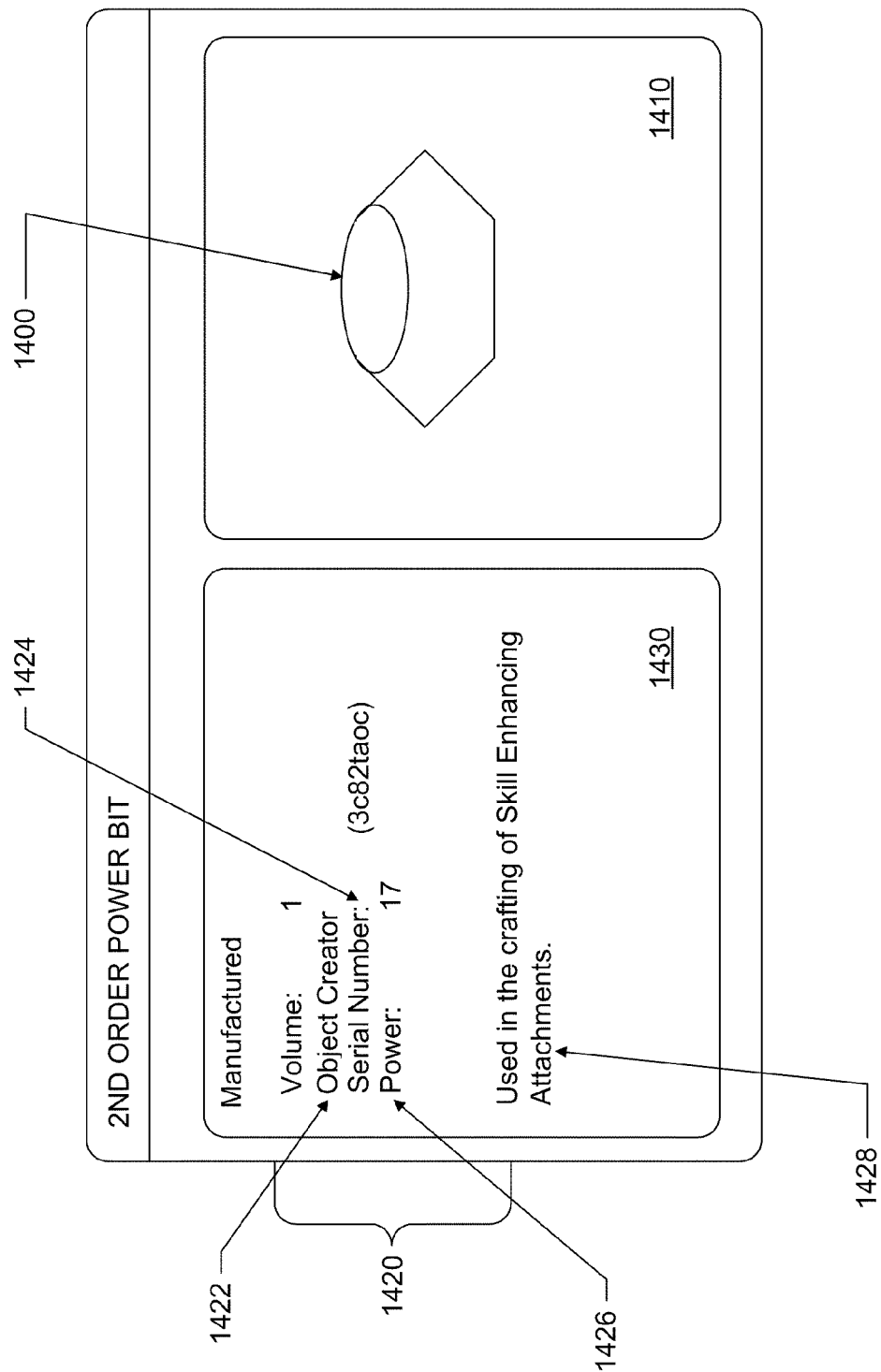
FIG. 14 illustrates one of various user interfaces (UIs) of the reverse engineering tool or system in accordance with implementations of the present invention.

FIG. 14 illustrates an example second order power bit 1400. Second order power bit 1400 is shown in inventory window 1410. A description 1420 of the second order power bit 1400 is provided in item window 1430. Description 1420 of the second order power bit 1400 may include, for example, a title 1422, a serial number 1424, a power level 1426, and a synopsis 1428.

In order to create a third order power bit, the player purchases an attachment upgrade from the expertise tree. The player then places two loot items in the reverse engineering tool 100. It should be appreciated that different combinations of items cause different results.

There are a variety of options a player may consider when creating a third order power bit. For example, in one implementation, a player places a first loot item that has two statistics associated with the loot item and a second single statistic loot item in the reverse engineering tool 100 to create a third order power bit. In another implementation, a player places two loot items having two statistics associated with each loot item in the reverse engineering tool 100 to create a third order power bit. In another implementation, a player places a first loot item that has three statistics associated with the loot item and a second single statistic loot item in the reverse engineering tool 100 to create a third order power bit. In each of these implementations, the player then selects the "Reverse Engineering" option from menu and a third order power bit drops into inventory.

It should be understood that a third order power bit may not always result from placing suitable loot items in the reverse engineering tool. A player's chances of creating or receiving a third order power bit depend on: (1) the level of the player's character, (2) the player's reverse engineering and expertise bonuses, and (3) the quality of the reverse engineering crafting tool.

Similar to power bits, skill enhancing attachments may be created having higher orders. As described with respect to FIGS. 2-8, a loot item 210 may be deconstructed into a power bit 500 and a loot item 610 may be deconstructed into a modifier bit 800. The player places power bit 500 and modifier bit 800 into the reverse engineering tool 100 and selects the "Create Skill Enhancing Attachment" option 1222. Thereafter, a skill enhancing attachment 1300 drops into inventory 1310.

Examining the skill enhancing attachment 1300 in the item window 1330 reveals the modification value 1322 of the attachment 1300. In some implementations, the modification value 1322 is directly affected by the source power bit 500. For example, if the power bit has a 20 point value and the modifier is a constitution modifier, the skill enhancing attachment would have a modification value of +20. Using this skill enhancing attachment on an article of armor would give the player a +20 to constitution when they have that armor item equipped.

Many skill modifiers have a maximum value of +25 (e.g., experimentation). However, main modifiers (e.g., strength, precision, constitution, agility, luck, stamina, etc.) are exempt from a maximum value cap.

Depending on skill level (e.g., restricted to advanced users), a player may upgrade a skill enhancing attachment to a second and, in some cases, a third order skill enhancing attachment.

In order to create a second order skill enhancing attachment, the player places a first order skill enhancing attachment, a modifier bit, and a second order power bit in the reverse engineering tool 100. In some implementations, the modifier bit is different than the one used to create the first order skill enhancing attachment.

Figure 15:
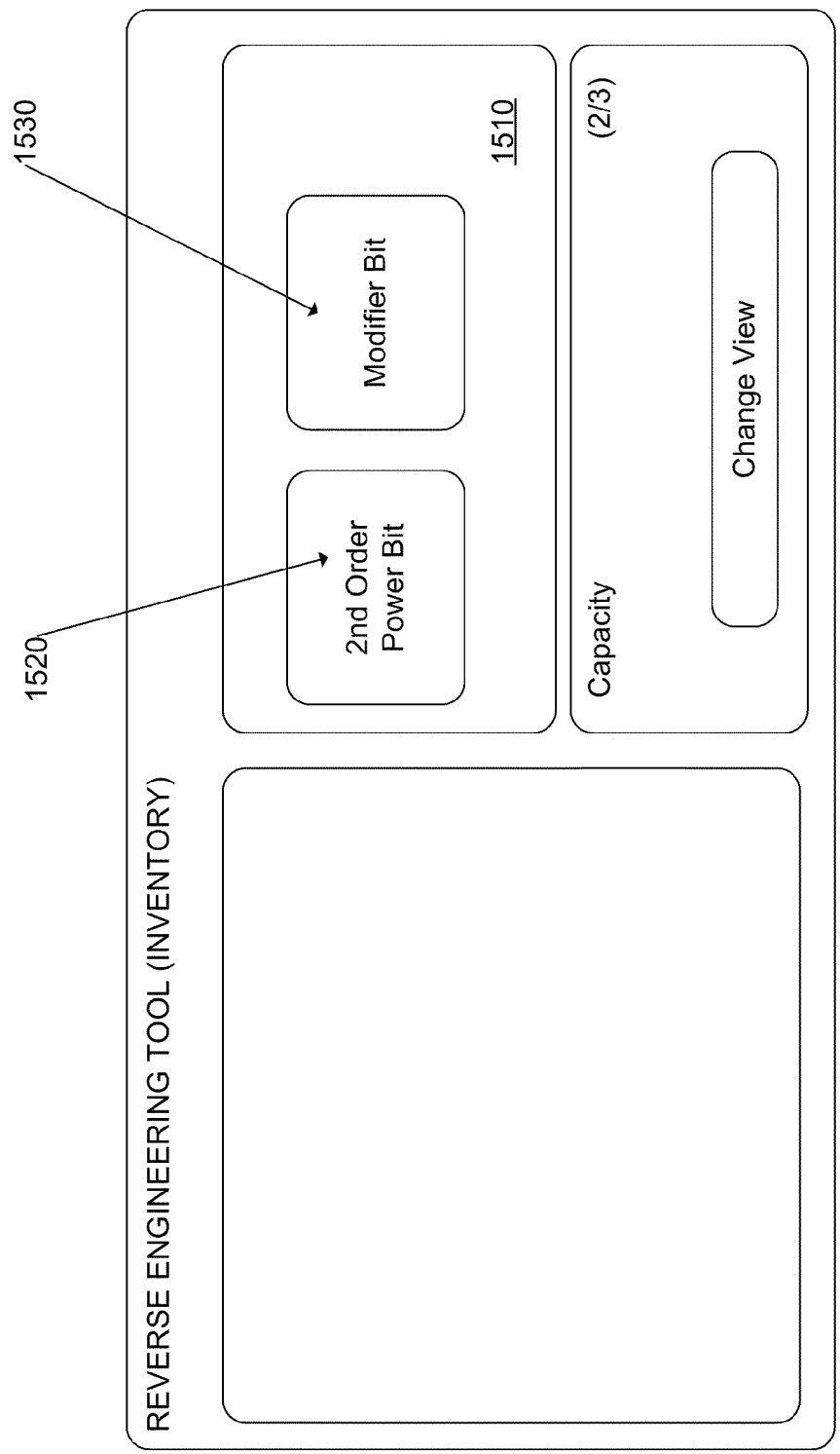
FIG. 15 illustrates one of various user interfaces (UIs) of the reverse engineering tool or system in accordance with implementations of the present invention.

FIG. 15 illustrates the creation of an example second order skill enhancing attachment. As shown in FIG. 15, the player has placed a second order power bit 1520 and a modifier bit 1530 in inventory window 1510. The player then selects the "Create Skill Enhancing Attachment" option from the menu and a second order skill enhancing attachment drops into inventory.

In order to create a third order skill enhancing attachment, the player places a second order skill enhancing attachment, a modifier bit, and a third order power bit in the reverse engineering tool 100. In some implementations, the modifier bit is different than the one used to create the second order skill enhancing attachment. The player then selects the "Create Skill Enhancing Attachment" option from the menu and a third order skill enhancing attachment drops into inventory.

It should be understood that a third order skill enhancing attachment may not always result from placing suitable items in the reverse engineering tool. A player's chances of creating or receiving a third order skill enhancing attachment depend on the player's trader expertise in creating higher order bits.

In some implementations, higher order skill enhancing attachments require the player to reverse engineer items that have a total of two or more statistic modifiers between them. For example, one item may have two statistics or two items may each have one statistic. To create a second order power bit, the player generally needs two or three statistics worth of items, depending on player skill. There is a remote chance of creating a second order power bit with a single statistic item for a highly skilled player. Similarly, there is a remote chance of creating a third order power bit with two statistics worth of items for a highly skilled player.

In some implementations, a player may drag and drop a skill enhancing attachment onto any crafted item that has sockets (e.g., clothing, armor). In a specific implementation, clothing, armor and weapons have one socket. Also, socketed crafted armor and clothing having skill enhancing attachments may be reverse engineered.

In some implementations, skill enhancing attachments are not limited to the six basic character attributes. Rather, they include a wide variety of possible bonuses for both existing and new abilities. The six basic character attributes are related to the six main skill modifiers in that the attributes map directly to the modifiers. For example, strength modifier bit when used will yield a skill enhancing attachment that provides bonus strength.

Figure 16:
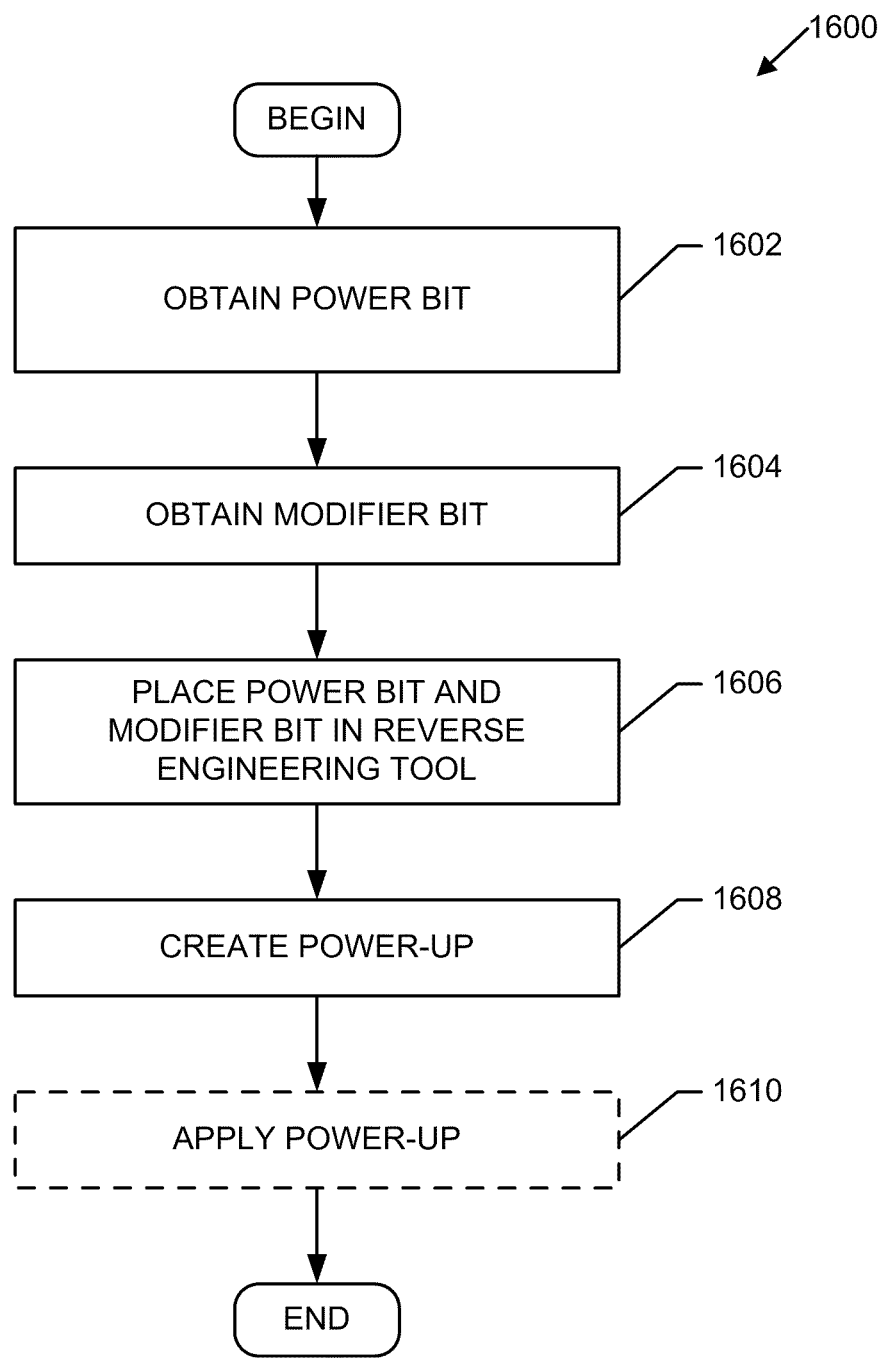
FIG. 16 shows a flowchart implementing a computer game that allows the players to build power-up using component pieces obtained by deconstructing a first item according to one implementation of the present invention.

FIG. 16 shows a flowchart 1600 implementing a computer game that allows the players create a power-up according to one implementation of the present invention. The computer game includes obtaining a power bit, at box 1602, from deconstructing a loot item in the reverse engineering tool. At box 1604, a modifier bit is obtained from deconstructing a loot item in the reverse engineering tool.

The computer game also includes placing the power bit and modifier bit in the reverse engineering tool at box 1606. At box 1608, the power-up is created by selecting the "Create Powerup" option on the reverse engineering tool. Once the power-up has been created, the player may optionally apply the power-up at 1610, as desired.

In some implementations, all traders may reverse engineer loot items to create power-ups or skill enhancing attachments. In specific implementations, structure traders may reverse engineer space loot which can be obtained from playing a "space" portion of the game. Structure traders mat also create the reverse engineering tool 100 to sell to customers (e.g., other players).

Bonuses from skill enhancing attachments and power-ups will generally stack. Bonuses from expertise and skill enhancing attachments/power-up bonuses will generally stack. In one implementation, reverse engineering skill bonuses are the only bonuses that are calculated when a player is reverse engineering items.

In some implementations, traders may specialize in reverse engineering by spending trader expertise points in reverse engineering. In general, reverse engineering on the ground and reverse engineering for space components are separate skills. As an example, a player cannot reverse engineer space ship parts in a reverse engineering tool that is used to reverse engineer loot items acquired on the ground.

Some items cannot be reverse engineered. For example, in some implementations, no-trade and bio-linked items may not be reverse engineered.

One implementation includes one or more programmable processors and corresponding computer system components to store and execute computer instructions, such as to provide the server and client computer systems providing the reverse engineering system in an online game environment, such as an MMO. In another implementation, the reverse engineering system is provided within a single computer or game system, such as in a game console system, and does not require access to a network for play.

Figure 17A:
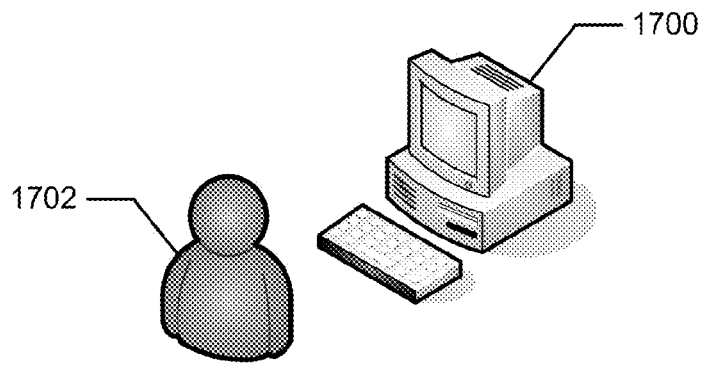
FIG. 17A illustrates a representation of a computer system and a user.

FIG. 17A illustrates a representation of a computer system 1700 and a user 1702. The user 1702 uses the computer system 1700 to perform reverse engineering. The computer system 1700 stores and executes a reverse engineering system 1790.

Figure 17B:
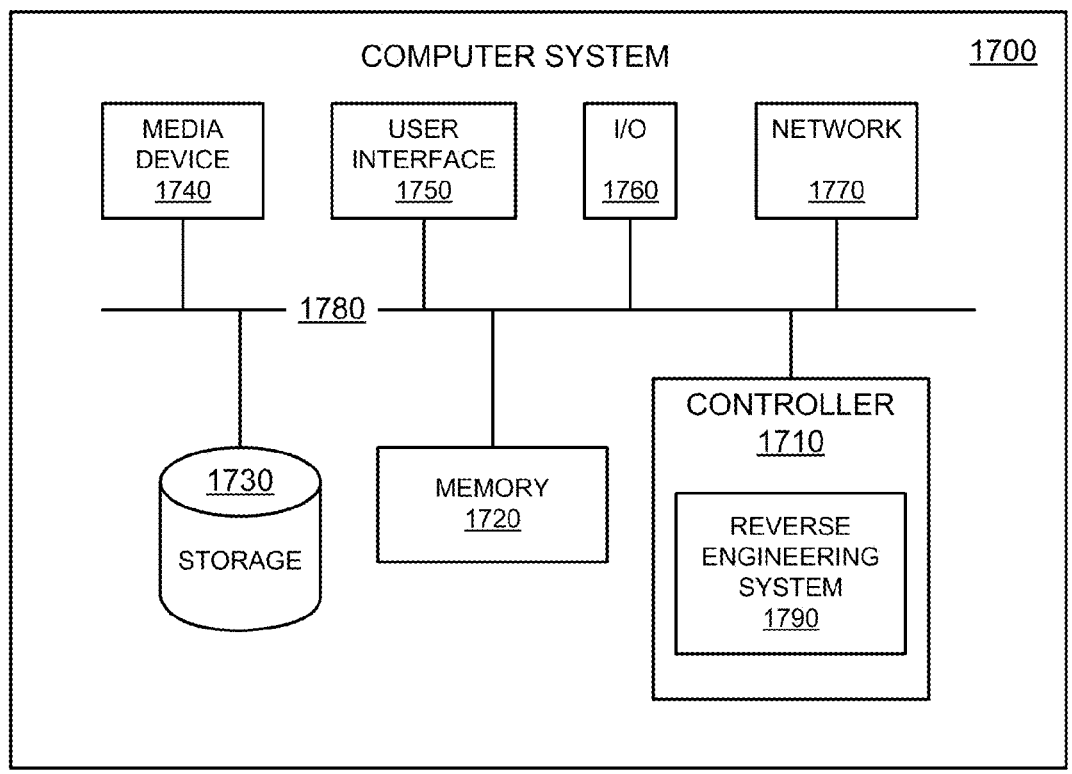
FIG. 17B is a functional block diagram illustrating the computer system hosting a reverse engineering system.

FIG. 17B is a functional block diagram illustrating the computer system 1700 hosting the reverse engineering system 1790. The controller 1710 is a programmable processor and controls the operation of the computer system 1700 and its components. The controller 1710 loads instructions (e.g., in the form of a computer program) from the memory 1720 or an embedded controller memory (not shown) and executes these instructions to control the system. In its execution, the controller 1710 provides the reverse engineering system 1790 as a software system. Alternatively, this service can be implemented as separate hardware components in the controller 1710 or the computer system 1700.

Memory 1720 stores data temporarily for use by the other components of the computer system 1700. In one implementation, memory 1720 is implemented as RAM. In one implementation, memory 1720 also includes long-term or permanent memory, such as flash memory and/or ROM.

Storage 1730 stores data temporarily or long term for use by other components of the computer system 1700, such as for storing data used by the reverse engineering system 1790. In one implementation, storage 1730 is a hard disk drive.

The media device 1740 receives removable media and reads and/or writes data to the inserted media. In one implementation, for example, the media device 1740 is an optical disc drive.

The user interface 1750 includes components for accepting user input from the user of the computer system 1700 and presenting information to the user. In one implementation, the user interface 1750 includes a keyboard, a mouse, audio speakers, and a display. The controller 1710 uses input from the user is to adjust the operation of the computer system 1700.

The I/O interface 1760 includes one or more I/O ports to connect to corresponding I/O devices, such as external storage or supplemental devices (e.g., a printer or a PDA). In one implementation, the ports of the I/O interface 1760 include ports such as USB ports, PCMCIA ports, serial ports, and/or parallel ports. In another implementation, the I/O interface 1760 includes a wireless interface for communication with external devices wirelessly.

The network interface 1770 includes a wired and/or wireless network connection, such as an RJ-45 or "Wi-Fi" interface (including, but not limited to 802.11) supporting an Ethernet connection.

The computer system 1700 includes additional hardware and software typical of computer systems (e.g., power, cooling, operating system), though these components are not specifically shown in FIG. 17B for simplicity. In other implementations, different configurations of the computer system can be used (e.g., different bus or storage configurations or a multi-processor configuration).

The above-described technology is applicable in various types of game settings in addition to science fiction, such as fantasy or superhero games. In these situations, the operation of the technology supporting the gameplay for reverse engineering would be as described herein.

In one implementation, players may deconstruct items, weaponry, armor or clothing and also dropped "junk" items. Deconstructing an item through reverse engineering generally destroys the original item. However, in some implementations, reverse engineering allows items to be combined together without initially deconstructing them.

As described above, deconstructed components may be used to create skill enhancing attachments and power-ups that may be applied to armor, weapons and clothing. Weapons are craftable with "sockets" to accommodate new skill enhancing attachments that may be created with reverse engineering.

Additional variations and implementations are also possible. For example, enhancement items can be created that provide positive and negative effects, such as to offset a total cost of constructing the item. In another example, the enhancement item does not change the statistics of an item, but instead changes its appearance (e.g., color or shape, such as decorative horns that could be added to a helmet). With all the different loot items and possible bonuses, there are upwards of 5,000 different combinations possible.

In one implementation, applying reverse engineering to an item creates a blueprint for the item, allowing a crafting character or player to learn to create the reverse engineered item again. The quality of the blueprint may be affected by the character's reverse engineering skill. In another implementation, the design for the enhancement item can be stored as plans or blueprints and used multiple times or taught or sold to other characters. In another implementation, the enhancement system is not used for a game, but for some other online environment, such as an online social environment or virtual world.

Various implementations are or can be implemented primarily in hardware using, for example, components such as application specific integrated circuits ("ASICs"), or field programmable gate arrays ("FPGAs"). Implementations of a hardware statistice machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or statistice machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. A storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A computer-implemented method of reverse engineering items in a computer game, the method comprising:
   selecting a first loot item;
   selecting a reverse engineering tool;
   placing the first loot item in the reverse engineering tool;
   creating a blueprint by a crafting character using a reverse engineering function on the reverse engineering tool corresponding to the first loot item, wherein a quality of the blueprint is determined by a skill of the crafting character applying the reverse engineering function; and creating a new item using the blueprint, wherein the new item provides effects including negative effects to balance cost or budget for the new item.

2. The method of claim 1, further comprising deconstructing the first loot item into one or more bits including power bits and modifier bits.

3. The method of claim 1, further comprising:
selecting a second loot item; and
placing the second loot item in the reverse engineering tool.

4. The method of claim 3, wherein implementing a reverse engineering function deconstructs the second loot item into one or more bits.

5. A computer-implemented method of reverse engineering items in a computer game, the method comprising:
selecting a first loot item;
selecting a second loot item, wherein the second loot item is different than the first loot item;
selecting a reverse engineering tool;
placing the first loot item and the second loot item in the reverse engineering tool;
creating a blueprint by a crafting character using a reverse engineering function on the reverse engineering tool corresponding to the first loot item,
wherein a quality of the blueprint is determined by a skill of the crafting character applying the reverse engineering function; and
creating a new item using the blueprint,
wherein the new item provides effects including negative effects to balance cost or budget for the new item.

6. The method of claim 5, wherein the first loot item is a non-electronic loot item.

7. The method of claim 6, wherein implementing a reverse engineering function deconstructs the first loot item into one or more power bits.

8. The method of claim 5, wherein the second loot item is an electronic loot item.

9. The method of claim 8, wherein the electronic loot item comprises a software module, chassis blueprint, medical device, or circuit board.

10. The method of claim 8, wherein implementing a reverse engineering function deconstructs the second loot item into one or more modifier bits.

11. The method of claim 5, further comprising:
placing one or more bits in the reverse engineering tool; and
implementing a create power-up function on the reverse engineering tool to create a power-up from one or more bits.

12. The method of claim 11, wherein the power-up boosts a player's clothing, armor, or weapons with a temporary bonus.

13. The method of claim 11, wherein the power-up is one of first, second, and third order power-up.

14. The method of claim 11, wherein the power-up is stackable.

15. The method of claim 11, further comprising:
implementing an apply power-up function on the reverse engineering tool to apply the power-up to a player's clothing, armor, or weapons.

16. The method of claim 5, further comprising:
placing one or more bits in the reverse engineering tool; and
implementing a create skill enhancing attachment function on the reverse engineering tool to create a skill enhancing attachment from the one or more bits.

17. The method of claim 16, wherein the skill enhancing attachment boosts a player's clothing, armor or weapons with a permanent bonus.

18. The method of claim 16, wherein the skill enhancing attachment is one of first, second, and third order skill enhancing attachment.

19. The method of claim 16, further comprising:
implementing an apply skill enhancing attachment function on the reverse engineering tool to apply the skill enhancing attachment to a player's socketed clothing, armor, or weapons.

20. A non-transitory computer-readable storage medium storing a computer program for reverse engineering items, the program comprising executable instructions that cause a computer to:
select a first loot item;
select a reverse engineering tool;
place the first loot item in the reverse engineering tool;
create a blueprint by a crafting character using a reverse engineering function on the reverse engineering tool corresponding to the first loot,
wherein a quality of the blueprint is determined by a skill of the crafting character applying the reverse engineering function; and
creating a new item using the blueprint,
wherein the new item provides effects including negative effects to balance cost or budget for the new item.

21. The non-transitory computer-readable storage medium of claim 20, further comprising executable instructions that cause a computer to:
select a second loot item;
place the second loot item in the reverse engineering tool; and
implement a reverse engineer function on the reverse engineering tool to deconstruct the second loot item into one or more bits.

22. The non-transitory computer-readable storage medium of claim 21, further comprising executable instructions that cause a computer to:
implement a create power-up function on the reverse engineering tool to create a power-up from the one or more bits.

23. The non-transitory computer-readable storage medium of claim 21, further comprising executable instructions that cause a computer to:
implement a create skill enhancing attachment function on the reverse engineering tool to create a skill enhancing attachment from the one or more bits.

24. A computer-implemented method of deconstructing loot items for creating particular bonuses in a computer game, the method comprising:
collecting loot items throughout the computer game;
loading the loot items into a reverse engineering tool for reverse engineering sessions;
reverse engineering a loot item in the reverse engineering tool to create a blueprint corresponding to the loot item,
wherein a quality of the blueprint is determined by a skill of a crafting character reverse engineering the loot item; and
creating a new item using the blueprint,
wherein the new item provides effects including negative effects to balance cost or budget for the new item.

25. The method of claim 24, further comprising creating a bonus from one or more bits,
wherein the bonus is one of power-up and a skill enhancing attachment.

26. The method of claim 25, wherein the bonus is one of first, second, and third order bonus.

* * * * *